US010084548B2

(12) United States Patent
Mary et al.

(10) Patent No.: US 10,084,548 B2
(45) Date of Patent: Sep. 25, 2018

(54) METHOD FOR TRANSMITTING A SEQUENCE OF DATA SYMBOLS, CORRESPONDING DEVICE FOR TRANSMISSION, SIGNAL, METHOD FOR RECEIVING, DEVICE FOR RECEIVING AND COMPUTER PROGRAM

(71) Applicants: Institut National Des Sciences Appliquees de Rennes, Rennes (FR); Universite De Rennes 1, Rennes (FR); CNRS—Centre National De La Recherche Scientifique, Paris (FR)

(72) Inventors: Philippe Mary, Cesson-Sevigne (FR); Adbullah Haskou, Rennes (FR); Christian Brousseau, Melesse (FR)

(73) Assignees: Institut National des Sciences Appliquees de Rennes, Rennes (FR); Universite de Rennes 1, Rennes (FR); Centre National de la Recherche Scientifique (CNRS), Paris (FR)

( * ) Notice: Subject to any disclaimer, the term of this patent is extended or adjusted under 35 U.S.C. 154(b) by 0 days.

(21) Appl. No.: 15/100,542

(22) PCT Filed: Nov. 28, 2014

(86) PCT No.: PCT/EP2014/075936
§ 371 (c)(1),
(2) Date: May 31, 2016

(87) PCT Pub. No.: WO2015/079020
PCT Pub. Date: Jun. 4, 2015

(65) Prior Publication Data
US 2016/0301479 A1 Oct. 13, 2016

(30) Foreign Application Priority Data

Nov. 29, 2013 (FR) ...................... 13 61884

(51) Int. Cl.
*H04B 10/70* (2013.01)
*H04L 25/03* (2006.01)
*H04L 27/26* (2006.01)

(52) U.S. Cl.
CPC ....... *H04B 10/70* (2013.01); *H04L 25/03254* (2013.01); *H04L 25/03828* (2013.01); *H04L 27/2626* (2013.01); *H04L 25/0328* (2013.01)

(58) Field of Classification Search
CPC combination set(s) only.
See application file for complete search history.

(56) References Cited

U.S. PATENT DOCUMENTS

| 2006/0056807 | A1  | 3/2006 | Grier |            |
|--------------|-----|--------|-------|------------|
| 2007/0153930 | A1* | 7/2007 | Reid  | H04L 25/0228 375/260 |
| 2013/0235744 | A1* | 9/2013 | Chen  | H04L 47/82 370/252 |

OTHER PUBLICATIONS

Ivan, LDPC-Coded OAM Modulation and Multiplexing for Deep-Space and Near-Earth Optical Communications, 2011—International Conference on Space Optical Systems and Application—pp. 325-330.*

(Continued)

*Primary Examiner* — David Payne
*Assistant Examiner* — Omar S Ismail
(74) *Attorney, Agent, or Firm* — David D. Brush; Westman, Champlin & Koehler, P.A.

(57) ABSTRACT

A method is provided for transmitting a sequence of data symbols including at least two data symbols of distinct values, delivering an electromagnetic wave carrying an orbital angular momentum. The method includes, for at least one data symbol to be transmitted: a bijective selection of an order of orbital angular momentum associating, with each distinct value of a data symbol, a distinct order of orbital angular momentum, and delivering a selected order of (Continued)

Figure 1:
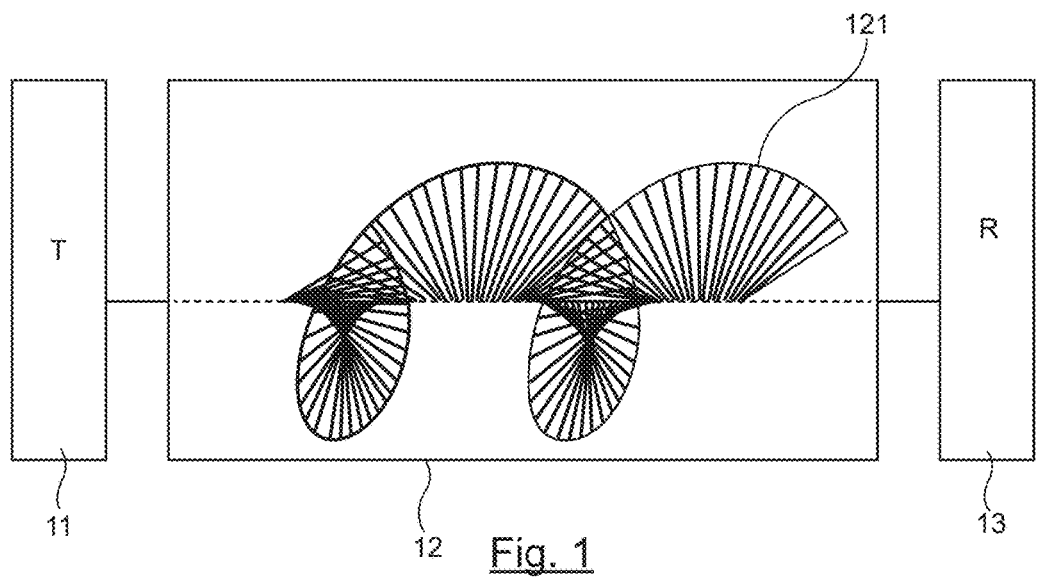

orbital angular momentum that is representative, by bijection, of the value of the at least one data symbol to be transmitted; and transmitting the electromagnetic wave carrying an orbital angular momentum, the order of orbital angular momentum of which corresponds to the selected order of orbital angular momentum.

12 Claims, 5 Drawing Sheets

(56) References Cited

OTHER PUBLICATIONS

Wu, Light beams with orbital angular momentum for free spaces optics, 2007 Chin. Phys. Soc. and IOP Publishing Ltd.—pp. 1334-1337.*

International Search Report and Written Opinion dated Jan. 19, 2015 for corresponding International Application No. PCT/EP2014/075936 filed Nov. 28, 2014.

English Translation of the International Search Report and Written Opinion dated Jan. 19, 2015 for corresponding International Application No. PCT/EP2014/075936 filed Nov. 28, 2014.

French Search Report and Written Opinion dated Sep. 11, 2014 for French Application No. 1361884 filed Nov. 29, 2013.

International Preliminary Report on Patentability dated May 31, 2016 for corresponding International Application No. PCT/EP2014/075936 filed Nov. 28, 2014.

Gibson et al., "Free-space information transfer using light beams carrying orbital angular momentum". Optics Express, OSA (Optical Society of America), Washington DC, (US), vol. 12, No. 22, Nov. 1, 2004 (Nov. 1, 2004), pp. 5448-5456, XP002500773.

Ivan B. Djordjevic, "Heterogeneous Transparent Optical Networking Based on Coded OAM Modulation", IEEE Photonics Journal, IEEE, USA, vol. 3, No. 3, Jun. 1, 2011 (Jun. 1, 2011), pp. 531-537, XP011355279.

Lavery et al., "Paper; Efficient measurement of an optical orbital-angular-momentum spectrum comprising more than 50 states", New Journal of Physics, Institute of Physics Publishing, Bristol, GB, vol. 15, No. 1, Jan. 14, 2013 (Jan. 14, 2013), p. 13024, XP020236825.

Marrucci et al., "Pancharatnam-Berry phase optical elements for wave front shaping in the visible domain: Switchable helical mode generation", Applied Physics Letters, American Institute of Physics, US, vol. 88, No. 22, May 30, 2006 (May 30, 2006), pp. 221102-221102, XP012081889.

Ivan B. Djordjevic, "LDPC-coded OAM modulation and multiplexing for Deep-Space and Near-Earth Optical Communications", IEEE, 2011 International Conference on Space Optical Sytems and Communications, (2011), pp. 325-333.

Thide et al., "Utilization of photon orbital angular momentum in low frequency radio domain", Physical Review letters, The American Physical Society vol. 99, No. 8, Aug. 24, 2007 (Aug. 24, 2007), pp. 081101-1 to 087701-4.

Mohammadi et al., "Orbital AngularMomentum in Radio—A System Study", IEEE Transaction on Antennas and Propagation, vol, 58, No. 2, Feb. 2010 (Feb. 2010), pp. 565-572.

Tamburini et al., "Encoding many channels in the same frequency through radio vorticity: first experimental test", New Journal of Physics, vol. 14, pp. 1-17, 2012, 03001.

Niemiec et al., "Excitation d'un moment angulaire orbital (OAM) d'une onde en bande millimétrique, à partir d'une lame de phase" ("Excitation of an angular momentum(OAM) of a millimetere-band weave from a phase plate"), 18ème Journée Nationales Microondes, May 15-17, 2013 (May 15, 2013).

Fontaine et al., "Efficient multiplexing and demultiplexing of free-space orbital angular momentum using photonic integrated circuits", Optical Fiber Communication Conference and Exposition (OFC/NFOEC), 2012 and the National Fiber Optic Engineers Conference, pp. 1-3, Mar. 4, 2012 (Mar. 4, 2012).

English equivelant document entitled "Flat Plate for OAM Generation in the Milimeter Band" for Niemiec et al., "Excitation d'un moment angulaire orbital (OAM) d'une onde en bande millimétrique, à partir d'une lame de phase" ("Excitation of an angular momentum(OAM) of a millimetere-band weave from a phase plate"), 18ème Journée, Nationales Microondes, May 15-17, 2013 (May 15, 2013).

English translation of the pertinent sections of document M. Desvignes et al ("Déroulement de phase : application à la correction de distorsions géométriques en IRM" (Phase unwrapping: geometric distortions correction on MRI), Traitement du Signal 2000, vol. 17, No. 4, pp. 313 to 324).

* cited by examiner

METHOD FOR TRANSMITTING A SEQUENCE OF DATA SYMBOLS, CORRESPONDING DEVICE FOR TRANSMISSION, SIGNAL, METHOD FOR RECEIVING, DEVICE FOR RECEIVING AND COMPUTER PROGRAM

CROSS-REFERENCE TO RELATED APPLICATIONS

This Application is a Section 371 National Stage Application of International Application No. PCT/EP2014/075936, filed Nov. 28, 2014, which is incorporated by reference in its entirety and published as WO 2015/079020 A1 on Jun. 4, 2015, not in English.

1. FIELD OF THE INVENTION

The field of the invention is that of digital communications, in transmission or in broadcast.

More specifically, the invention relates to the transmission of electromagnetic waves, from at least one sender to at least one receiver.

In particular, the invention relates to the transmission of information by electromagnetic waves carrying an orbital angular momentum.

This type of wave is especially used in the field of optical digital communications and radiofrequency digital communications.

2. PRIOR ART

2.1 Definition of the Orbital Angular Momentum

Information is presently conveyed over great distances by means of antennas radiating electromagnetic plane waves (EM).

An electromagnetic wave (EM) is defined by its amplitude, its wave vector, its frequency and its angular momentum.

In the 1930s, it was shown in theoretical physics that the angular momentum can be sub-divided into two parts, the intrinsic angular momentum or spin angular momentum (SAM) associated with wave polarization and the extrinsic angular momentum or orbital angular momentum (OAM) associated with the spatial distribution of the electrical field.

Compared with the spin angular momentum, which can take only two orthogonal values, the orbital angular momentum can advantageously take an infinity of orthogonal discrete values.

An electromagnetic wave carrying an orbital angular momentum, in other words characterized by a non-zero orbital angular momentum, is characterized by an azimuthal dependence of its phase denoted as $e^{-jl\varphi}$ with l being the order of the orbital angular momentum (also called topological charge) corresponding to the number of rotations of the phase per wavelength, $\varphi$ being the azimuth angle.

In other words, the orbital angular momentum has the effect of producing a wavefront which is no longer equiphase but helical with a value of the phase of the field $\vec{E}$ that depends on the azimuth angle and on the order l of the orbital angular momentum as represented in FIG. 1, which shows the wave carrying an l order angular orbital momentum 121 transmitted in a channel 12 between a transmission device T 11 and a reception device R 13.

The beginning of the 1990s saw the first practical uses of the orbital angular momentum of an electromagnetic wave in the optical field, and the use of the orbital angular momentum as an additional degree of freedom in the field of optical links has recently been described by I. Djordevic ("*LDPC-coded OAM modulation and multiplexing for Deep-Space and Near-Earth Optical Communications*", International Conference on Space Optical systems and Communications).

Figure 2:
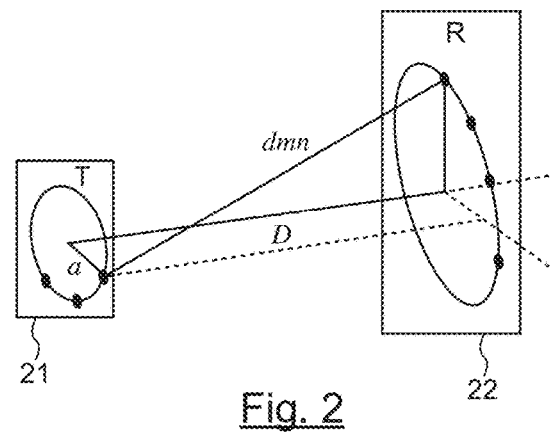

At the same time, B. Thidé ("*Utilization of photon orbital angular momentum in the low frequency radio domain*", Physical Review Letters, vol. 99, n°8, August 2007) has also shown the possibility of generating electromagnetic waves carrying an orbital angular momentum from network antennas, such as a circular antenna network illustrated by FIG. 2 representing a transmission device T 21 corresponding to a circular network of antennas of radius $\alpha$, of which only three antennas are shown and a reception device R 22 at a distance D from the transmission device and corresponding to a circular network of antennas of radius greater than $\alpha$, of which only four antennas are represented, or again a network of reflector antennas. These studies were complemented by studies used to measure the orbital angular momentum of an electromagnetic wave such as the one implemented by S. M. Mohammadi ("*Orbital Angular momentum in Radio—A system Study*", IEEE Transaction on antennas and Propagation, vol. 58, n°2, February 2010).

At present, the properties of the orbital angular momentum are not much exploited or are essentially used to generate orthogonal channels available for a multiplexing of information.

2.2 Prior-art Techniques for Transmitting Digital Information

Numerous techniques for transmitting digital information have been developed.

These techniques include techniques of optical transmission and techniques of radiofrequency transmission illustrated respectively by the documents cited here above. These techniques use distinct transmission schemes because of the intrinsic differences pertaining to the optical signals and to the digital signals respectively.

There is therefore a need to provide a technique of transmission that is applicable in the optical domain as well as in the radiofrequency domain while at the same time having limited complexity and a cost of implementation and of transposition from the optical domain into the radiofrequency domain.

3. SUMMARY OF THE INVENTION

The invention proposes a novel solution in the form of a method for transmitting a sequence of data symbols comprising at least two data symbols of distinct values, delivering an electromagnetic wave carrying an orbital angular momentum.

According to the invention, such a method comprises, for at least one data symbol to be transmitted:
  a step for the bijective selection of an order of orbital angular momentum associating, with each distinct value of a data symbol, a distinct order of orbital angular momentum, and delivering a selected order of orbital angular momentum that is representative, by bijection, of the value of said at least one data symbol to be transmitted, a step for transmitting said electromagnetic wave carrying an orbital angular momentum, the order of orbital angular momentum of which corresponds to said selected order of orbital angular momentum.

Thus, the invention relies on a wholly novel and inventive approach to the transmission of a signal.

Indeed, the invention diverts the classical use of the order of orbital angular momentum usually dedicated to the multiplexing of information.

According to this classic use, the order of orbital angular momentum is used to identify an information transportation channel, several orthogonal transportation channels identified, by the order of orbital angular momentum being used for the multiplexed transmission of several data symbols of distinct values. In other words, according to this classic use, a single transport channel identified by its order of orbital angular momentum is used to transport a plurality of symbols of distinct values.

According to the present technique, the order of orbital angular momentum directly represents the value of the data symbol to be transmitted. Thus, a value of the order of the orbital angular momentum corresponds to only one value of data symbol.

Thus approach based on a novel use of the orbital angular momentum to represent a data symbol to be transmitted furthermore has the advantage of being applicable to both the radiofrequency and the optical communications domains.

Thus, according to the present technique, the role played by the orbital angular momentum passes from transportation to direct representation of information. In other words, unlike with the classic use of the order of orbital angular momentum where a same order of orbital angular momentum transports equally well several symbols of distinct values of data, an order of orbital angular momentum bijectively represents only one value of data symbol.

The present technique therefore is used to dedicate an order of orbital angular momentum to represent a single value of data symbol.

The transmission of a sequence of data symbols therefore, according to the present technique, requires the transmission of a series of electromagnetic waves each carrying an orbital angular momentum, the order of which represents the value of a data symbol.

Thus, a data sequence formed by five successive symbols of distinct values will be transmitted by means of five temporally successive electromagnetic waves, the order of the orbital angular momentum carried by each of these waves being distinct from one electromagnetic wave to the other, each distinct order respectively representing each value of the five successive data symbols.

For example, the bijective selection of the order of orbital angular momentum representing a value of data symbols is a relationship of bijective correspondence between an order of orbital angular momentum and a data symbol value to be transmitted.

This relationship of bijective correspondence corresponds for example to a bijective mathematical function, the input parameter of which is the value of the symbol to be transmitted. The choice of a non-trivial bijective mathematical function of low complexity (for example a linear combination) or high complexity (implementing for example an exponential function) can especially be used to secure the transmission of the symbol.

According to another example, this relationship is defined by a table directly establishing for example the correspondence between a set of binary values defining the value of the symbol to be transmitted and the value of the corresponding orbital angular momentum. Just like the non-trivial mathematical function mentioned here above, a table of correspondence is also used to secure the transmission, since a third party will be unable to identify the information transmitted without knowing the bijective relationship used by the method of transmission according to the invention.

According to one particular aspect of the invention, the order of orbital angular momentum is selected when it is equal to the value of the data symbol to be transmitted.

Such an equality between the order of orbital angular momentum and the value of the symbol to be transmitted enables a simple and rapid selection of the mode of transmission of the electromagnetic wave carrying an orbital angular momentum.

Thus, this bijective relationship of identity between order of orbital angular momentum and value of data symbol makes it possible especially to accelerate the transmission of a sequence of values as compared with the above-mentioned relationships of correspondence.

According to one example of implementation, the method of transmission according to the invention also comprises the following steps implemented prior to said selection step:
a step for receiving a binary data string,
a step for determining the maximum absolute value of order of orbital angular momentum that can be transmitted by a transmission device implementing said method for transmitting,
a step for forming said sequence of data symbols from said binary string, said step for forming taking account of said absolute maximum value of order of orbital angular momentum.

This example of implementation takes into account the capacity of the transmission device to produce a plurality of orders of orbital angular momentum of transmission that are distinct and transforms a binary string according to the maximum number of orders of orbital angular momentum capable of being produced.

For example, the optical and radiofrequency transmission device is capable of transmitting a maximum absolute value of order of orbital angular momentum equal to 4, the orders of orbital angular momentum therefore belonging to the set $\{-4, -3, -2, -1, 0, +1, +2, +3, +4\}$.

The step for forming symbols from a received binary string transforms a group of bits into a value belonging to the set $\{-4, -3, -2, -1, 0, +1, +2, +3, +4\}$, when the bijective relationship between the value of data symbol and the order of the orbital angular momentum is a relationship of identity. The value −2 of the symbol obtained after the step for forming will then correspond directly, according to the relationship of bijective identity, to an order of orbital angular momentum equal to −2.

When the bijective relationship is more complex than the relationship of identity illustrated here above, the step for forming symbols from the received binary string transforms a group of bits into a value belonging to an intermediate set, the values of which are the antecedents, in mathematical terms, of the set of orders of the orbital angular momentum.

According to one particular example of implementation, the step for forming corresponds to an N-state modulation, N being an integer equal to twice the absolute maximum value of the order of orbital angular momentum plus one.

For example, for a radiofrequency transmission or an optical transmission, the step for forming corresponds to an N-state pulse amplitude modulation, called a PAM N-ary modulation.

For an optical transmission device, a modulation with single or double polarization, for example a quadrature phase shift keying modulation (QPSK modulation) or again a 16-state quadrature amplitude modulation (16QAM) also enables a value representing the symbol in the constellation (also called a state value) to be associated with a group of several bits.

According to one particular embodiment, when the method of transmission is implemented by a radiofrequency transmission device comprising a plurality of sending elements, the method of transmission furthermore comprises a step of series-parallel replication of the order of the orbital angular momentum selected, delivering the order of orbital angular momentum at input of each element for sending said plurality of sending elements.

For example, when the transmission device is a circular network of antennas comprising eight antennas, if the order of the orbital angular momentum equal to −4 is selected for a value equal to −4 of a data symbol, each of the eight antennas receives the value −4 at input so as to form a single electromagnetic wave having a number of phase rotations equal to −4 per wavelength.

In another embodiment, the invention relates to a device for transmitting a sequence of data symbols comprising at least two data symbols of distinct values, delivering an electromagnetic wave carrying an orbital angular momentum.

According to the invention, such a device comprises, for at least one data symbol to be transmitted:
  a module for the bijective selection of an order of orbital angular momentum associating, with each distinct value of a data symbol, a distinct order of orbital angular momentum, and delivering a selected order of orbital angular momentum representing, by bijection, the value of said at least one data symbol to be transmitted,
  a module for transmitting said electromagnetic wave carrying an orbital angular momentum, the order of the orbital angular momentum of which corresponds to said selected order of orbital angular momentum.

Such a transmission device is a radiofrequency or optical transmission device and is especially adapted to implementing the method for transmitting described here above. This transmission device could of course comprise the different characteristics pertaining to the method for transmitting described here above, which can be combined or taken in isolation. Thus, the characteristics and advantages of this transmission device are the same as those of the method for transmitting. They are therefore not described in more ample detail.

Another aspect of the invention relates to a signal transmitted in the form of an electromagnetic wave carrying an orbital angular momentum.

According to the invention, said electromagnetic wave carrying an orbital angular momentum has an order of orbital angular momentum selected bijectively during the transmission of said signal so as to represent, by bijection, the value of a data symbol to be transmitted.

This signal could of course comprise the different characteristics pertaining to the method of transmission of the invention.

In particular, this signal can carry a piece of information on the type of bijective selection implemented when sending, when the reception device does not "know" this type of bijective selection beforehand.

In another embodiment, the invention relates to a method for receiving a signal transmitted in the form of an electromagnetic wave carrying an angular momentum] delivering an estimation of a data symbol of a sequence of data symbols comprising at least two data symbols of distinct values, said electromagnetic wave carrying an orbital angular momentum having an order of orbital angular momentum selected bijectively during the transmission of said signal so as to represent the value of said data symbol by bijection.

Such a method for receiving comprises a step for estimating the value of said data symbol, implementing a step for detecting said order of orbital angular momentum.

Such a method for receiving is especially capable of receiving and estimating a sequence of data symbols transmitted according to the method for transmitting according to the invention. Thus, if the method for transmitting is applied to all the symbols of the sequence of data, the method will be implemented as many times as there are symbols in the data sequence.

Indeed, a sequence of data symbols transmitted according to the method for transmitting according to the invention requires the successive transmission of as many electromagnetic waves as there are data symbols in the sequence to be transmitted according to this method.

At reception, the invention will therefore implement as many detections of order of orbital angular momentum as there are data symbols to be estimated.

For example, a sequence of 12 distinct data symbols transmitted one after the other will lead to 12 detections of orders of distinct orbital angular momentum.

According to another example, four symbols of identical values have been transmitted successively by means of four identical electromagnetic waves of order of angular momentum; the same order of orbital angular momentum will be detected four times in succession.

According to a first example of implementation, said step for detecting implements a Fourier transform of said signal.

In assuming for example that the propagation channel does not undergo fading, such a detection benefits from the properties of the Fourier transform, for example a fast Fourier transform (FFT) according to which, after application to the received signal, only the non-zero input of the signal enables identification of the order of identified orbital angular momentum.

Such a detection is therefore based on the detection of a maximum of energy.

According to a second example of implementation, said step for detecting carries out a detection by maximum likelihood.

Such a detection is then based on the value of the pair formed by l the order of the angular momentum and θ the pointing angle, especially the angle of the pair (l, θ) maximizing the density of probability of the signal received.

In particular, according to one variant of this second example of implementation, said step for detecting by maximum likelihood is iterative and uses a Fisher information matrix.

According to a third example of implementation, said step for detecting implements a determining of a phase gradient comprising:
  a step for shaping said signal in vector form,
  a step of unwrapping of a phase of each term of said vector form and of determining a phase of the product of the terms of said vector form,
  a step for obtaining said order of estimated orbital angular momentum implementing a division of said phase of the product of the terms of said vector form multiplied by the term $\pi(L-1)$, L being an integer corresponding to a maximum absolute value of the order of orbital angular momentum capable of being received, multiplied by two.

According to one variant of the above examples of implementation, the method furthermore comprises a preliminary step for equalizing said signal in baseband.

For example, the equalization is an equalization by maximum likelihood, a zero-forcing equalization (ZF equalization), a decision feedback equalization or again equalization based on a minimum mean square error (MMSE).

In particular, the third example of implementation is particularly efficient when the transmission channel is any channel whatsoever. In other words, when the channel takes account of the free space loss but also of a fading, requiring a preliminary implementation of an equalization.

In another embodiment, the invention relates to a device for receiving a signal transmitted in the form of an electromagnetic wave carrying an angular momentum, delivering an estimation of a data symbol of a sequence of data symbols comprising at least two data symbols of distinct values, said electromagnetic wave carrying an orbital angular momentum presenting an order of orbital angular momentum selected bijectively during the transmission of said signal so as to represent the value of said data symbol by bijection.

According to the invention, such a device comprises an estimator of the value of said data symbol, implementing a detector of said order of orbital angular momentum.

Such a device for receiving is a radiofrequency or optical device and is especially suited to implementing the method for receiving described here above. This device for receiving could of course comprise the different characteristics of the method for receiving described here above which can be combined or taken in isolation. Thus, the characteristics and advantages of this device for receiving are the same as those of the method for receiving. They are therefore not described in greater detail.

The invention also pertains to a computer program comprising instructions to implement a method for transmitting or receiving described here above when this program is executed by a processor.

This program can use any programming language whatsoever and be in the form of source code, object code or an intermediate code between source code and object code, such as in a partially compiled form or in any other desirable form whatsoever.

The methods according to the invention can be implemented in various ways, especially in wired and/or software form.

The invention also relates to one or more information carriers readable by a computer, and comprising instructions of one or more computer programs as mentioned here above.

4. LIST OF FIGURES

Figure 3:
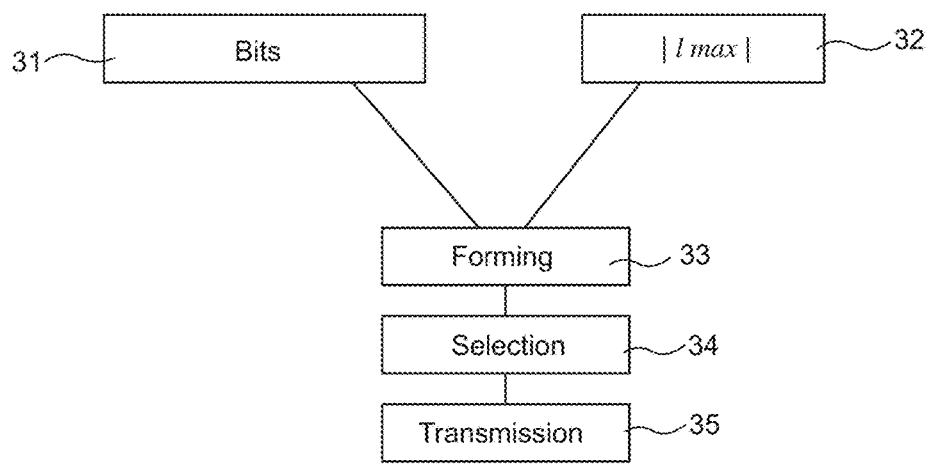
Figure 4:
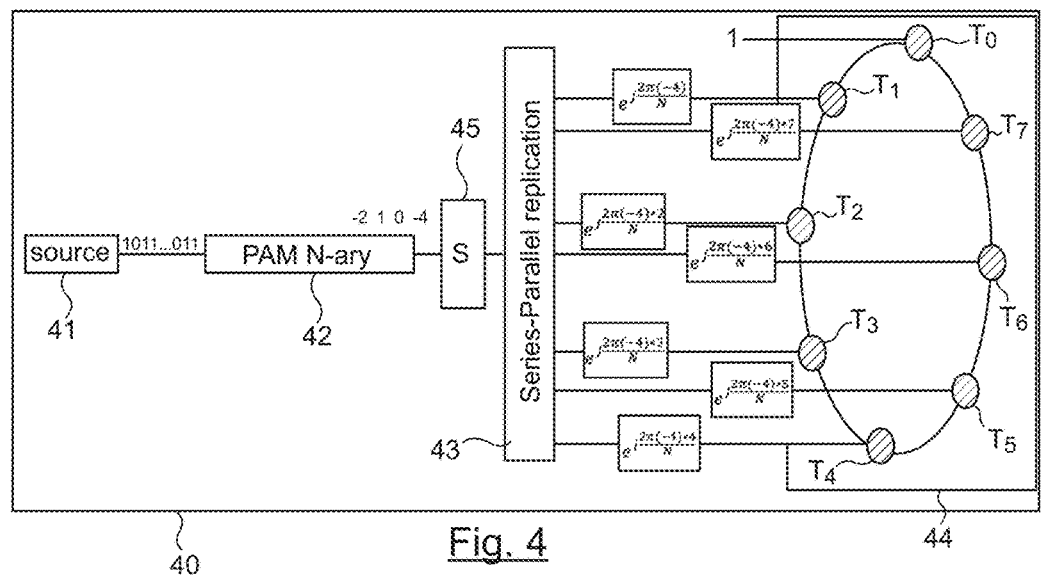
Figure 5A:
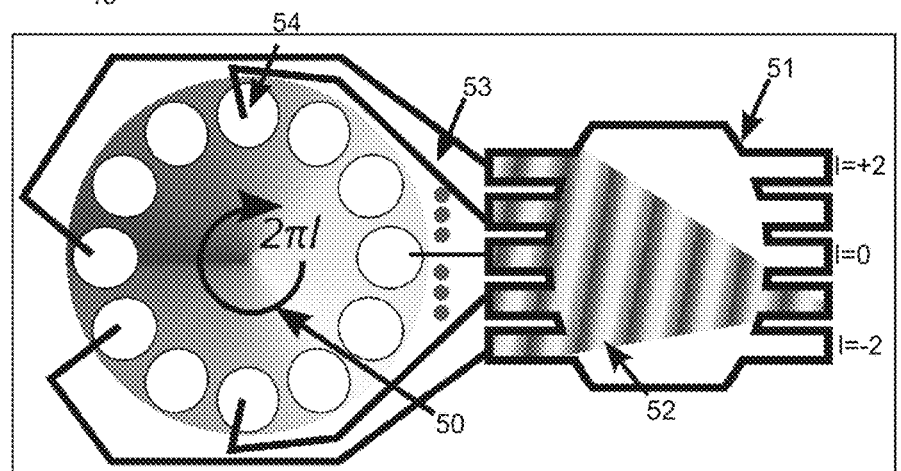
Figure 5B:
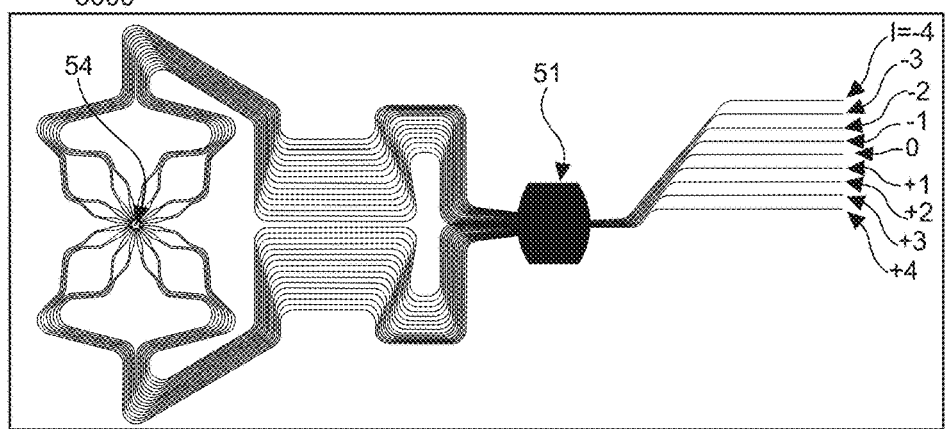
Figure 6:
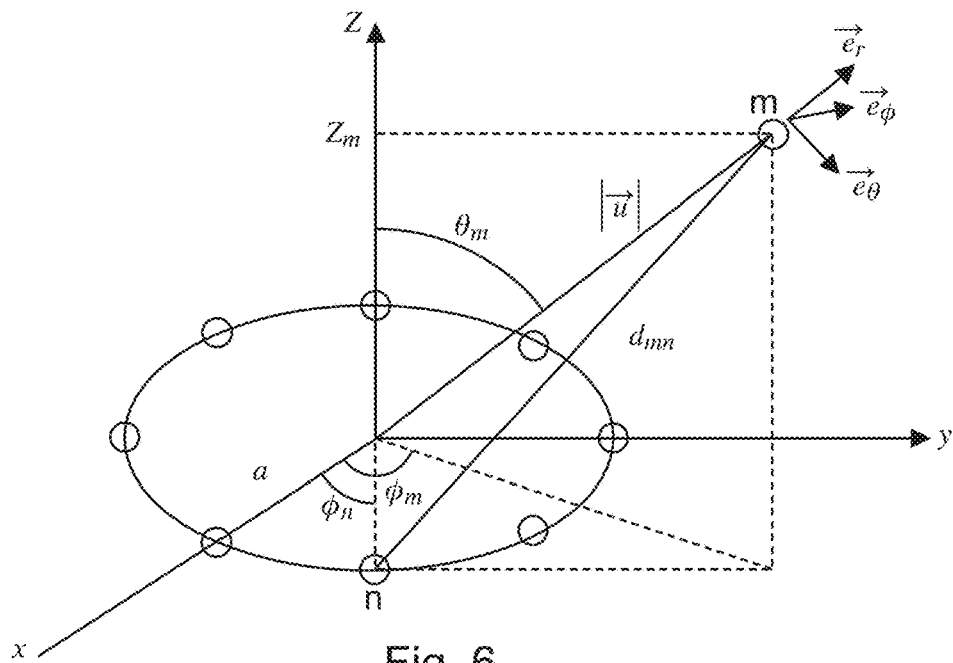
Figure 7:
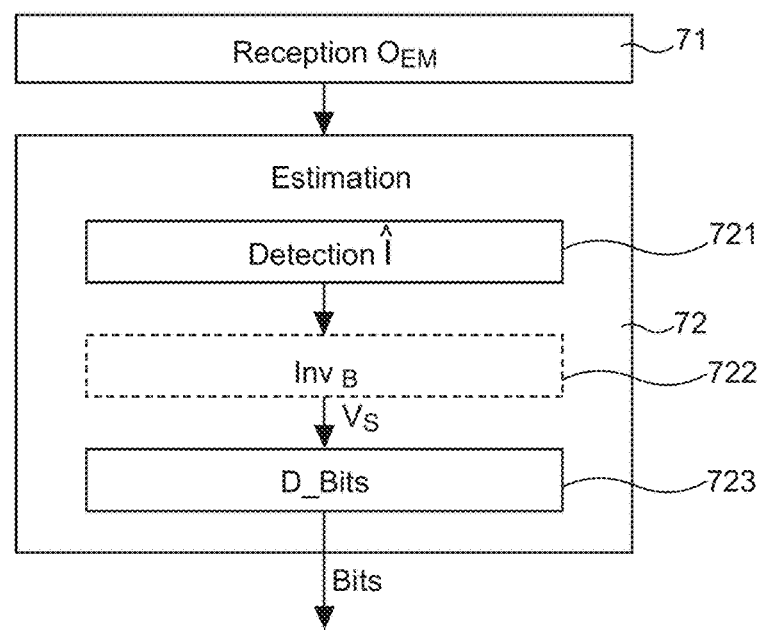
Figure 8:
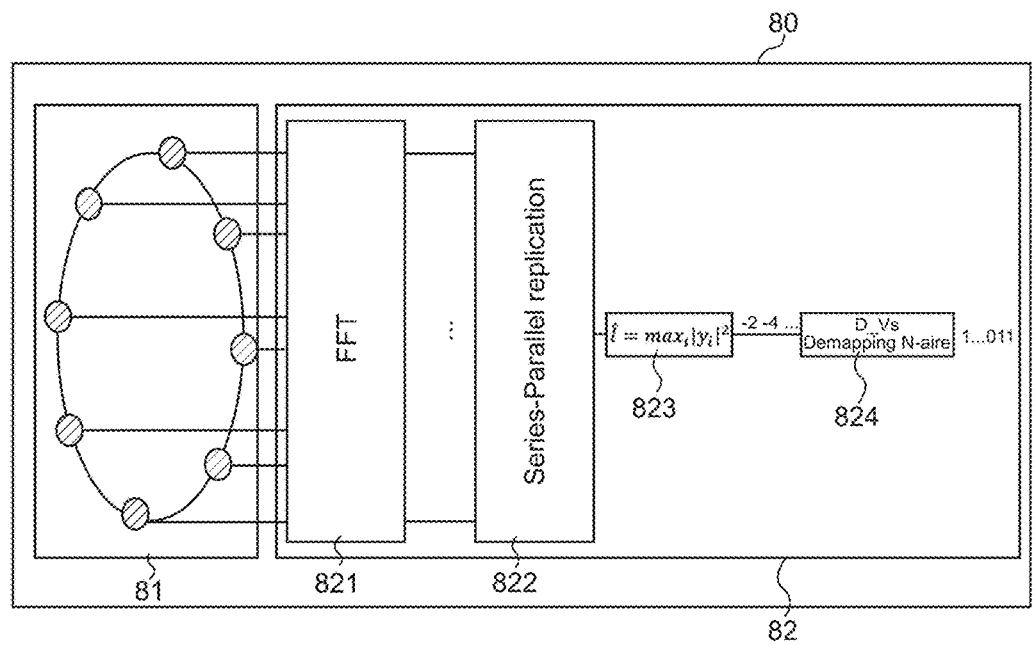
Figure 9:
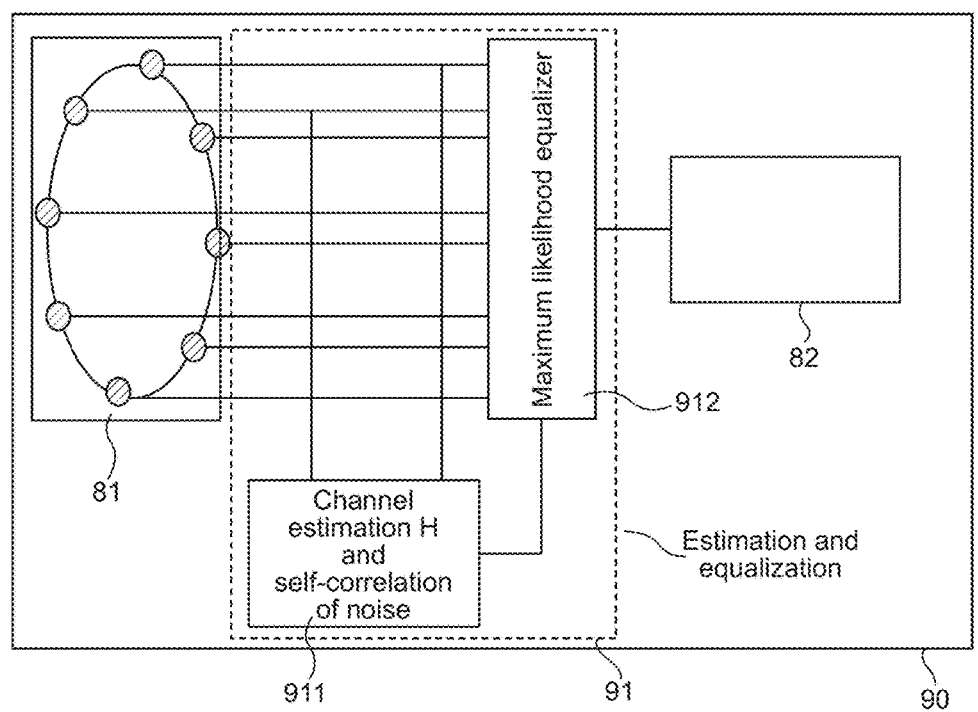
Figure 10:
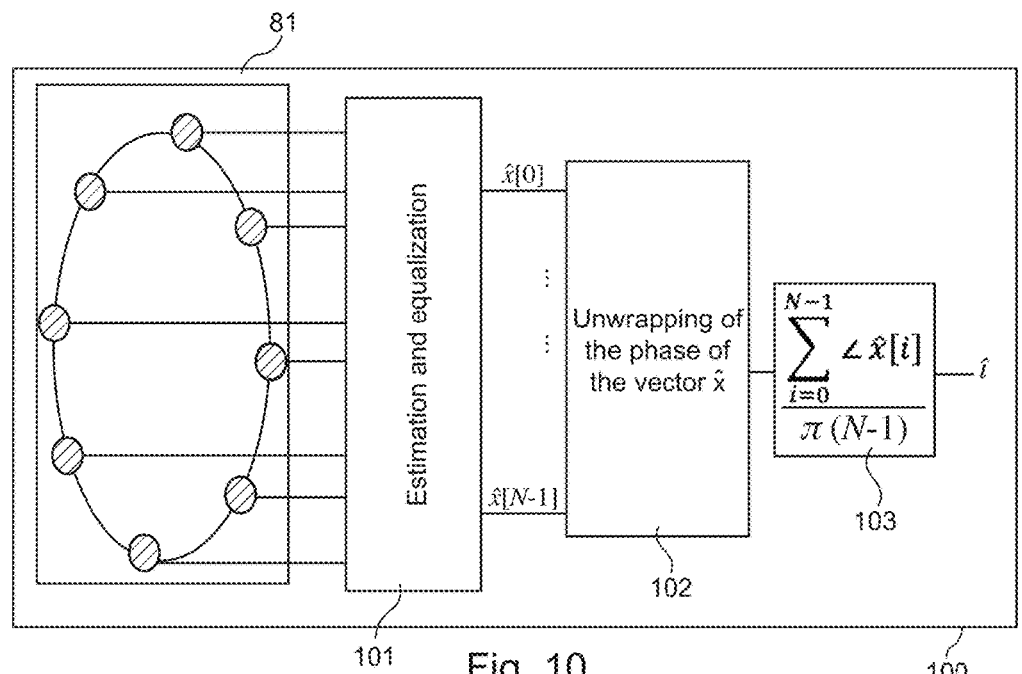

Other characteristics and advantages of the invention shall appear more clearly from the following description of a particular embodiment given by way of a simple, illustrative and non-exhaustive example and from the appended figures, of which:

FIG. 1 already described with reference to the prior art illustrates the helical wavefront of an electromagnetic wave carrying an orbital angular momentum, FIG. 2 already described with reference to the prior art illustrates a radiofrequency transceiver system for transmission-reception of an electromagnetic wave carrying an orbital angular momentum, FIG. 3 presents the main steps of the method for transmitting according to one embodiment of the invention, FIG. 4 is a schematic representation of a radiofrequency transmission device according to one example of the invention, FIGS. 5A and 5B derived from the prior art respectively represent the general principle of a optical transmission module for transmitting an electromagnetic wave presenting an orbital angular momentum of a predetermined order and the corresponding waveguide architecture, FIG. 6 is a representation of a spatial localization of a reception element of a radiofrequency reception device according to the invention, FIG. 7 presents the main steps of the method for receiving according to the invention, FIGS. 8 to 10 illustrate different examples of implementation of the method for receiving according to the invention, FIGS. 11 and 12 respectively illustrate the simplified structure of a transmission device implementing a technique of transmission, and a device for receiving implementing a technique of reception according to one particular embodiment of the invention.

5. DESCRIPTION OF ONE EMBODIMENT OF THE INVENTION 5.1 General Principle

The general principle of the invention relies on a novel technique for transmitting information by electromagnetic waves based on the use of the orbital angular momentum.

The order of orbital angular momentum of the electromagnetic wave to be transmitted in effect directly represents the symbol value of data to be sent, a bijective relationship being established according to the invention between the order of orbital angular momentum and the symbol value of the data to be transmitted.

Thus, as compared with the prior-art techniques where the properties of the orbital angular momentum are essentially used to generate orthogonal channels available for the transportation of information associated with a multiplexing of information, the present invention proposes to dedicate an order of orbital angular momentum to the representation of only one value of data symbols.

The technique according to the invention increases spatial diversity and can especially be applied in short-range transmission, for example to transmit identification data.

At reception, the rebuilding of the data symbol sent is simple and efficient because it can be deduced by a single inversion of the bijective relationship used when sending to select the order of orbital angular momentum to be used to generate the electromagnetic wave.

Here below, referring to FIG. 3, we present the main steps implemented by a method of transmission according to one embodiment of the invention.

5.2 Description of Examples of Implementation of the Method of Transmission

According to one particular example of implementation, the method for transmitting according to the invention receives (31) at input M pieces of binary data to be transmitted $\{d\}_{1:M}$, M being an integer and d being a binary value equal to 1 or 0.

In addition, the method implements a step (32) for determining the maximum absolute value of order $l_{max}$ of the orbital angular momentum capable of being transmitted by the transmission device used.

For example, when the transmission device has N=5 sending elements, the maximum absolute value of order l, also called mode, of orbital angular momentum that can be encoded distinctly is then such that abs(l)<N/2, giving $l_{max}=2$, so that $l \in \{-2, -1, 0, 1, 2\}$.

According to another example, if the transmission device has N=8 sending elements available, the possible values, also called modes, of the order l of orbital angular momentum which can be encoded distinctly are such that $-N/2 \leq l < N/2$ so that $l \in \{-4, -3, -2, -1, 0, 1, 2, 3\}$.

Transmission modules are used to transmit an electromagnetic wave carrying an orbital angular momentum with a predetermined order, are for example represented in FIGS. 4 and 5A, 5B pertaining respectively to a radiofrequency transmission and to an optical transmission.

In particular, the radiofrequency transmission module (44) of FIG. 4 has eight elements ($T_0$, $T_1$, $T_2$, $T_3$, $T_4$, $T_5$, $T_6$, $T_7$) and is therefore capable of generating electromagnetic waves carrying an orbital angular momentum, of which the order $l \in \{-4, -3, -2, -1, 0, 1, 2, 3\}$.

It must also be noted that other transmission modules capable of exciting an orbital angular momentum have been devised, for example a parabolic reflector that is classic but twisted in order to induce a phase azimuthal distribution as described by F. Tamburini et al. (*"Encoding many channels on the same frequency through radio vorticity: first experimental test"*, New Journal of Physics, Vol 14, 2012, 033001), or again a phase blade as described by R. Niemiec (*"Excitation d'un moment angulaire orbital (OAM) d'une onde en bande millimétrique, à partir d'une lame de phase"* ("Excitation of an orbital angular momentum (OAM) of a millimeter-band wave from a phase plate"), 18$^{ème}$ Journée Nationales Microondes, 15-17 May 2013).

According to another example, illustrated by FIGS. 5A and 5B, an optical transmission module (5000 and 5001) corresponding to a photonic integrated circuit made of silicon can also be used to generate an electromagnetic wave carrying an orbital angular momentum with a predetermined order l as described by N. K. Fontaine et al. (*"Efficient multiplexing and demultiplexing of free-space orbital angular momentum using photonic integrated circuits"*, Optical Fiber Communication Conference and Exposition (OFC/NFOEC), 2012 and the National Fiber Optic Engineers Conference, pages 1 to 3, 4-8 Mar. 2012).

Such an optical transmission module comprises especially a circular network coupler (54) and a star coupler (51). The circular network coupler is especially based on the use of monomode apertures (54) sending or collecting light. This light is then guided to the star coupler (51) by means of optical waveguides (53), the length of which is adapted to the location of the aperture in the wavefront considered in order to convert an azimuth phase (50) representing the order of the orbital angular momentum corresponding to the number of rotations of the phase per wavelength, and a variation of amplitude into linear phase variations (52). FIG. 5A represents an optical transmission module capable of generating electromagnetic waves carrying an orbital angular momentum, of which the order $l \in \{-2, -1, 0, 1, 2\}$, while FIG. 5B represents an optical transmission module capable of generating electromagnetic waves carrying an orbital angular momentum, of which the order $l \in \{-4, -3, -2, -1, 0, 1, 2, 3, 4\}$.

These existing transmission modules, conventionally used to transport information associated with information multiplexing, cannot be used as such to implement the invention because there is no relationship between the value of the data symbol to be transmitted and the order of the orbital angular momentum.

The step (31) for receiving M binary data to be transmitted and the step (32) for determining the maximum absolute value of order $l_{max}$ of the orbital angular momentum capable of being transmitted by the transmission device used are independent and can be implemented successively, according to any order whatsoever or in parallel as shown in FIG. 3.

Once these two steps have been performed, the method according to the embodiment shown in FIG. 3 implements a step (33) for forming a sequence of data symbols from the binary string, in taking account of the maximum absolute value of order $l_{max}$ of the orbital angular momentum.

In other words, the string of digital symbols $\{d\}_{1:M}$, M being an integer and d being a binary value equal to 1 or 0, is "encoded" in an alphabet of data symbols defined by the possible orders (or again states) of the orbital angular momentum, these orders being demarcated by the maximum absolute value of order $l_{max}$ of the orbital angular momentum capable of being transmitted by the previously determined transmission device.

According to one particular example of implementation, the step for forming corresponds to an N-state modulation, N being an integer equal to twice said maximum absolute value of order of orbital angular momentum plus one.

For example, for a radiofrequency transmission device or an optical transmission device, the step for forming corresponds to an N-state pulse amplitude modulation, called a PAM N-ary modulation.

Such a PAM N-ary modulation (42) is especially illustrated in FIG. 4, as is a set of bits of the binary string 1011..01 represented by a data symbols, the value of which in the constellation is −2, 1, 0, −4. The correspondence between the binary sequence 1011..01 and the representation or mapping in the constellation is for example set up by means of an encoding such as a Gray encoding or any other means used to establish such a mapping.

A quadrature phase shift keying (QPSK) modulation or again a 16-state quadrature amplitude modulation (16QAM) is also used to associate a value of mapping of the data symbol in the constellation (also called a state value) with a group of several bits.

It must be noted that the term "value" is understood to mean any piece of information used to localize a data symbol in a constellation. Such a value can therefore correspond to an integer value associated with a position number in the constellation, but also a pair of coordinates in the plane of the constellation.

Once the data symbols have been shaped and their value in the constellation defined, the method according to the invention implements a step of bijective selection (34) of an order of orbital angular momentum associating, with each distinct value of data symbols, a distinct order of orbital angular momentum and delivering a selected order of orbital angular momentum representing, by bijection, the value of said at least one data symbol to be transmitted.

Thus, by making the order of orbital angular momentum carry the value of the symbol, a spatial modulation is created.

This aspect is especially illustrated in FIG. 4 where said method of transmission is implemented by a radiofrequency transmission device (40) comprising a plurality of sending elements ($T_0$, $T_1$, $T_2$, $T_3$, $T_4$, $T_5$, $T_6$, $T_7$).

The bijective selection (34) according to the invention of an order of orbital angular momentum is implemented by a selection module (45).

According to the example illustrated in FIG. 4, the order of orbital angular momentum is selected when it is equal to the value of the data symbol to be transmitted. Thus, according to this example, the bijective relationship between the order of orbital angular momentum and the value representing the data symbol in the constellation is therefore a relationship of identity, in other words a relationship of equality, between the value representing the data symbol in the constellation and the order of orbital angular momentum.

Such a bijective selection based on an equality between the value representing the data symbol in the constellation and the order of orbital angular momentum is not possible unless the mode of formation and representation of data symbols in the constellation delivers an integer value.

In other words, when the data symbol is represented by the value −4 in the constellation, an order of orbital angular momentum l=−4 is selected. As a consequence, the order of angular momentum directly represents the value of the information to be transmitted.

When the value corresponds for example to a pair of coordinates in the constellation plane, the bijective selection is based on a bijective relationship associating with each distinct pair of coordinates a distinct order of orbital angular momentum.

Then, with regard to the embodiment represented in FIG. 4 representing a radiofrequency transmission device (40), the method of transmission furthermore comprises a step of series-parallel replication (43) of the order of orbital angular momentum selected l=−4 so that it is delivered at input of each sending element ($T_0$, $T_1$, $T_2$, $T_3$, $T_4$, $T_5$, $T_6$, $T_7$).

Once the bijective selection of the order of orbital angular momentum to be transmitted is done, the method according to the invention implements a step (35) for transmitting said electromagnetic wave carrying an orbital angular momentum, the order of orbital angular momentum of which corresponds to said selected order of orbital angular momentum.

An example of this transmission is for example illustrated by FIG. 4, where the order of orbital angular momentum l=−4 has been selected and transmitted by N=8 sending elements corresponding to eight sending radiofrequency antennas.

The signal (35) transmitted by the eight radiofrequency antennas ($T_0$, $T_1$, $T_2$, $T_3$, $T_4$, $T_5$, $T_6$, $T_7$) forming the network of circular antennas corresponding to the transmission module (44) is therefore transmitted in the following form:

$$x = \frac{1}{\sqrt{N}} \begin{bmatrix} 1 \\ e^{j2\pi \frac{l}{N}} \\ \vdots \\ e^{j2\pi \frac{l(N-1)}{N}} \end{bmatrix}$$

where l represents the N-ary information symbol to be transmitted.

Thus, with regard to the illustration of FIG. 4, when l=−4, the antenna $T_6$ generates an electromagnetic wave, the expression of which comprises a term $$\frac{1}{\sqrt{N}} e^{j2\pi \frac{(-4)*6}{N}}.$$

It must be noted that the steps for receiving (31), determining (32), forming and replication (43) are optional, their implementation can be eliminated when the transmission device directly receives the values representing the constellation, each data symbol to be transmitted and/or when the transmission device uses a single sending element such as an optical waveguide.

In addition, the steps of the method for receiving according to the invention are repeated as many times successively as there are data symbols in the sequence of data symbols transmitted preliminarily.

5.3 Description of Examples of Implementation of the Method of Reception

5.3.1 Case of a Transmission Channel without Fading

The received signal r, corresponding to the signal transmitted according to the method of transmission described here above has the following expression: r=Hx+n, where H is the matrix representing the channel 12 between the transmission device T and the reception device R as represented by FIG. 1 and represents solely the free-space loss in a communication between these two devices and n such that $n \hookrightarrow \mathcal{CN}(0,\sigma^2 I_N)$, a complex Gaussian noise, for example a circular complex Gaussian noise received by each of the reception elements, the reception elements corresponding to radiofrequency antennas when the communications system (formed by at least one transmission device and at least one reception device) is a radiofrequency communications system.

It must be noted that for a radiofrequency communications system, it is quite possible to implement a system comprising N sending elements and N receiving elements as to implement a system comprising $N_E$ sending elements and $N_R$ reception elements, $N_E$ and $N_R$ being distinct.

In the case of an N×N radiofrequency communications system, the matrix H representing the channel can be written as $$H = \frac{\lambda}{4\pi} \begin{bmatrix} \frac{e^{-jkd_{11}}}{d_{11}} & \frac{e^{-jkd_{12}}}{d_{12}} & \cdots & \frac{e-jkd_{1N}}{d_{1N}} \\ \frac{e^{-jkd_{21}}}{d_{21}} & & & \vdots \\ \vdots & & \ddots & \vdots \\ \frac{e^{-jkd_{N1}}}{d_{N1}} & \cdots & \cdots & \frac{e-jkd_{NN}}{d_{NN}} \end{bmatrix}$$

with $$k = \frac{2\pi}{\lambda}$$

being the number of waves, $d_{mn}$ being the distance between the $n^{th}$ sending element and $m^{th}$ reception element, with:

$$d_{mn} = \sqrt{a^2 + \frac{z_m^2}{\cos^2 \theta_m} - 2az_m \tan\theta_m \cos(\phi_m - \phi_n)}$$

where α is the radius of the sending antenna, $z_m$ is the distance between the plane of the sending antenna and that of the receiving antenna, $\theta_m$ is the pointing angle on the reception antenna m in spherical coordinates, $\phi_m$ is the azimuth of the sensor of the reception antenna in spherical coordinates and $$\phi_n = \left\{\frac{2\pi n}{N}\right\}_{n=0,\ldots,N-1}$$

is the angular position of the sending elements in the plane of the antenna network, these parameters being illustrated by FIG. 6.

Here below, referring to FIG. 7, we present the main steps implemented by a method for receiving according to one embodiment of the invention.

According to one particular example of implementation, the method for receiving according to the invention inputs (71) an electromagnetic wave $O_{EM}$.

According to the invention, the electromagnetic wave $O_{EM}$ carries an orbital angular momentum having an order of orbital angular momentum selected bijectively during the transmission of the signal so as to represent the value of a data symbol by bijection.

Once this step for receiving has been performed, the method according to the embodiment shown in FIG. 7 implements a step of estimation (72) of the value of the data symbol transmitted, comprising a step (721) for detecting the order of orbital angular momentum $\hat{l}$ of the electromagnetic wave $O_{EM}$.

Once the order of the orbital angular momentum $\hat{l}$ of the electromagnetic wave $O_{EM}$ has been detected, the method for receiving according to the invention determines (722) the value Vs representing, in the constellation, the data symbol transmitted. This determining especially implements an inversion $Inv_B$ of the bijective relationship having allowed the selection of the order of orbital angular momentum $\hat{l}$.

Then, starting from the value Vs, one or more bits D_bits are determined (723) by correspondence between the value Vs of representation in the constellation (known as demapping) and a binary set comprising at least one bit, for example through a decoding such as a Gray decoding.

A) Detection of the Order of Orbital Angular Momentum Based on the Implementing of a Fourier Transform.

The signal r is received (71) by the reception module 81 of the reception device 80 illustrated in FIG. 8, comprising for example a plurality of reception elements (optical or radiofrequency elements as represented in FIG. 8) and belonging to a communications system N×N.

For example, when the reception device is a radiofrequency or optical reception device, a baseband conversion is applied.

A fast Fourier transform (FFT) is then applied (821) to the received vector r[m], $\forall m \in \{0, \ldots, N-1\}$, N being an integer corresponding to the number of reception elements so that y the resultant vector is expressed as follows:

$$y = F_N r = F_N Hx + F_N n$$
$$= F_N(h \otimes x) + \tilde{n}$$
$$= F_N h \odot F_N x + \tilde{n}$$
$$= \tilde{h} \odot \delta_{ln} + \tilde{n}$$

with $\tilde{h} = F_N h$ being the Fourier transform of the first row h of the transmission channel between the N sending elements and the first reception element. By property, the FFT of the vector x is a dirac function $\delta_{ln}$ such that:

$$\delta_{ln} = \begin{cases} 1 & si\; l = n \\ 0 & si\; l \neq n \end{cases}$$

in addition $\otimes$ and $\odot$ are respectively the circular convolution operators and Hadamard product (in other words the term-to-term product).

Thus, by construction, a single input of y contains the information on the order l of orbital angular momentum used.

Without noise n, the single non-zero input of y gives the order l of the orbital angular momentum used. For example, if N=8 and l transmitted=−4, then:

$$\delta_{ln} = \begin{bmatrix} 0 \\ 0 \\ 0 \\ 0 \\ 1 \\ 0 \\ 0 \\ 0 \end{bmatrix} \text{ and as a consequence}$$

$$y = \begin{bmatrix} y_0 \\ y_1 \\ y_2 \\ y_3 \\ y_4 \\ y_5 \\ y_6 \\ y_7 \end{bmatrix} = \begin{bmatrix} \tilde{h}_0 \\ \tilde{h}_1 \\ \tilde{h}_2 \\ \tilde{h}_3 \\ \tilde{h}_4 \\ \tilde{h}_5 \\ \tilde{h}_6 \\ \tilde{h}_7 \end{bmatrix} \odot \begin{bmatrix} 0 \\ 0 \\ 0 \\ 0 \\ 1 \\ 0 \\ 0 \\ 0 \end{bmatrix} + \begin{bmatrix} \tilde{n}_0 \\ \tilde{n}_1 \\ \tilde{n}_2 \\ \tilde{n}_3 \\ \tilde{n}_4 \\ \tilde{n}_5 \\ \tilde{n}_6 \\ \tilde{n}_7 \end{bmatrix} = \begin{bmatrix} \tilde{n}_0 \\ \tilde{n}_1 \\ \tilde{n}_2 \\ \tilde{n}_3 \\ \tilde{h}_4 + \tilde{n}_4 \\ \tilde{n}_5 \\ \tilde{n}_6 \\ \tilde{n}_7 \end{bmatrix}$$

Finally, the decision on the order l of orbital angular momentum used during the transmission is based on the detection of the maximum energy of the elements constituting the vector y, in assuming that the channel undergoes no fading.

After a parallel-series conversion (822) of the elements constituting the vector y to create a block of N elements in a row y'=[y[0], . . . y[N−1]], the detection of the order l of orbital angular momentum used during the transmission is then implemented by means of an energy detector such that: $\hat{l} = \max_i |y_i|^2$, with $i \in [0, N-1]$. In other words, the absolute value squared is taken on the elements constituting the vector y, i.e. $|y_i|^2$ and the maximum index i gives the value of the order l of the orbital angular momentum used, with the following rule:

If maximum index $i_{max} \in$ $$\left\{0, \ldots \left\lfloor\frac{N-1}{2}\right\rfloor\right\}$$

is such that then $\hat{l} = i_{max}$
if $i_{max} \in \{\lfloor N-1/2\rfloor+1, \ldots, N-1\}$ then $\hat{l} = \{-\lfloor N/2\rfloor, \ldots, -1\}$.

Finally, once the order $\hat{l}$ of the orbital angular momentum of the electromagnetic wave $O_{EM}$ is detected, the method for receiving according to the invention determines D_Vs (824) the value Vs representing, in the constellation, the data symbol transmitted in implementing an inversion of the bijective relationship that has enabled the selection of the order of orbital angular momentum $\hat{l}$.

Then, from the value Vs, one or more bits are determined (824) by correspondence between the value Vs of representation in the constellation (demapping) and a binary set comprising at least one bit, using for example a decoding such as the Gray decoding.

B) Detection by Maximum Likelihood of the Order of Orbital Angular Momentum.

Here below, we present a variant of an embodiment with regard to the detection described here above based on the implementation of a Fourier transform.

The present variant is based on a detection by maximum likelihood (or scoring).

According to this alternative embodiment, the signal r is received (71) by the reception module 81 and then, assuming that the value of the angle of aperture $\theta_m$ (represented in FIG. 6) is also unknown, it is necessary to estimate the vector $\alpha=[1,\theta]^T$ maximizing the density of probability (ddp) $p(y;\alpha)$ of the received signal. In assuming that $\theta_m=\theta$, $\forall m \in \{1, \ldots, N\}$ the density of probability is expressed in the following form:

$$p(y;\alpha) = \frac{1}{\pi\sigma^{2M}} e^{-\frac{1}{\sigma^2}\sum_{m=0}^{M-1}\left|y[m]-\frac{\lambda\cos\theta}{4\pi z}e^{-jk\frac{z}{\cos\theta}}\sum_{n=0}^{N-1}e^{jld_n}e^{jak\sin\theta\cos(\phi_m-\phi_n)}\right|^2}$$

The following relationship is obtained: $\max_\alpha p(y;\alpha) \Leftrightarrow \max_\alpha \ln p(y;\alpha)$.

According to one alternative implementation, the search for the vector $\alpha$ is implemented by successive iterations from an initial state of $\alpha$ and from the Fisher information matrix I, especially the value of $\alpha$ at the instant $k+1$, is such that:

$$\alpha_{k+1} = \alpha_k + I^{-1}(\alpha)\frac{\partial \ln p(y;\alpha)}{\partial \alpha}\bigg|_{\alpha=\alpha_k},$$

with $I(\alpha)$, the Fisher information matrix on the parameters $\alpha$, and the generic term of which is:

$$\{I(\alpha)\}_{i,j} = \frac{\partial^2 \ln p(y,\alpha)}{\partial \alpha_i \partial \alpha_j}.$$

5.3.2 Case of any Unspecified Transmission Channel

The received signal r, corresponding to the signal transmitted according to the method for transmitting described here above, always has the expression: r=Hx+n, where H is the matrix representing the channel 12 between the transmission device T and the reception device R as represented in FIG. 1, such that $H \in \mathbb{C}^{M \times N}$ of which each element $h_{m,n}$ is constituted by the free space loss part as well as a complex coefficient $\epsilon_{mn} \sim \mathcal{CN}(0,1)$ the gain of which is a Rayleigh relationship, In distant field, the expression of the element $h_{m,n}$ is the following:

$$h_{m,n} = \epsilon_{mn}\frac{\lambda\cos\theta_m}{4\pi z}e^{-jk\frac{z}{\cos\theta_m}}e^{jak\sin\theta_m\cos(\phi_m-\phi_n)}.$$

The signal r is received (71) by the reception module 81 of the reception device 90, illustrated by FIG. 9, comprising for example a plurality of M reception elements (optical or radiofrequency as represented in FIG. 9) and belonging to a communications system N×M, with M≥N, N and M representing respectively the number of sending elements and the number of reception elements.

According to one example of implementation of the method for receiving according to the invention in any unspecified channel, an estimator (91) is implemented to estimate the data vector sent x and implements an equalization (912) by maximum likelihood (MV), this equalization being optimal because it has a minimum variance for the estimation of the data vector sent x.

Such an equalization (912) is implemented after estimation (911) of the transmission channel H and self-correlation of the noise so that: $\hat{x}=(H^H C^{-1} H)^{-1} H^H C^{-1} s$ where $H^H$ is the conjugate transpose matrix of H, In addition, C is the matrix of covariance of the noise such that $C = \mathbb{E}[nn^H] \in \mathbb{C}^{M \times M}$.

The signal received after processing is then expressed by the following equation:

$$\hat{x} = x + (H^H C^{-1} H)^{-1} H^H C^{-1} n.$$

Thus, the vector $\hat{x}$ is an estimate of the vector x plus a noise vector, each constituent element of which is a complex number.

Once this estimation of the received signal has been made, the detection (82) of the order l of the orbital angular momentum used during the transmission is based on the implementation of a Fourier transform as described here above with reference to FIG. 8.

According to another alternative, after estimation and equalization (101) as described here above or by using any other type of equalizer such as a zero forcing (ZF) equalizer, a decision feedback equalizer, or again an equalizer based on a minimum mean square error (MMSE) equalizer, the detection (82) of the order l of the orbital angular momentum used during the transmission can also be implemented by means of a determining of a phase gradient as illustrated by FIG. 10.

Such a determining of a phase gradient comprises:
  a step for shaping said signal in vector form,
  a step of unwrapping of the phase of each term of said vector form and determining (102) the phase of the product of the terms of said vector form,
  a step (103) for obtaining said estimated order of orbital angular momentum implementing a division of the phase of the product of the terms of said vector form by the term $\pi(L-1)$, L being an integer corresponding to said maximum absolute value of order of orbital angular momentum capable of being received multiplied by two.

For example, in the case of a radiofrequency transmission module with N sending elements, L=N.

In other words, the phase of the product of the terms of the vector $\hat{x}$ is estimated and then divided by $\pi(L-1)$ such that $$\hat{l} = \frac{\angle\left(\prod_{i=0}^{L-1}\hat{x}[i]\right)}{\pi(L-1)} = \frac{\sum_{i=0}^{L-1}\frac{2\pi l i}{L} + \phi_i}{\pi(L-1)},$$

with $\phi_i$ as a random phase term due to the Gaussian noise filtered by means of an equalization by maximum likelihood (MV). Without noise, $\phi_i = 0 \forall i \in \{0, \ldots, L-1\}$.

More specifically, the phase of the vector $\hat{x}$ is determined by phase unwrapping, i.e. when the phase gradient between two measurement point exceeds π, the phase measured is corrected by an addition of a multiple of 2π. Methods for running the phase making it possible to determine a multiple of this kind are especially disclosed in another context by M. Desvignes et al ("*Déroulement de phase: application à la correction de distorsions géométriques en IRM*" (Phase unwrapping: geometric distortions correction on MRI), Traitement du Signal 2000, Volume 17, n°4, pages 313 to 324).

Naturally, the phase measurement at each point is disturbed by a noise term, but this noise term is attenuated by preliminary equalization.

When there is no noise, such a detector enables a perfect detection of the order 1 of the orbital angular momentum used during the transmission because by using the mathematical development of L−1 integers, the following is obtained:

$$\sum_{i=0}^{L-1} \frac{2\pi l i}{L} = \pi l(L-1).$$

In a noisy channel, it can be noted that the greater the value of L the lower will be the noise $$\frac{\phi_i}{\pi(L-1)}$$

for the estimation of l.

5.4 Structure of the Transmission and Reception Devices

Figure 11:
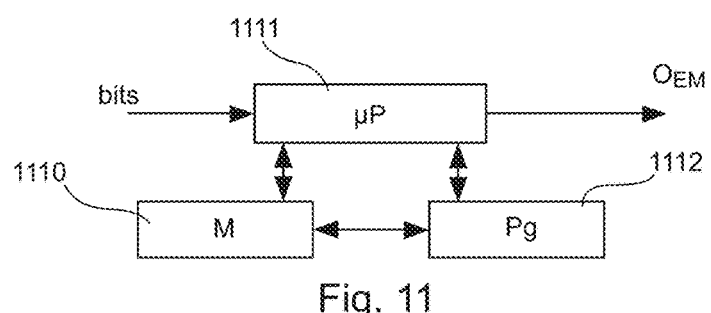
Figure 12:
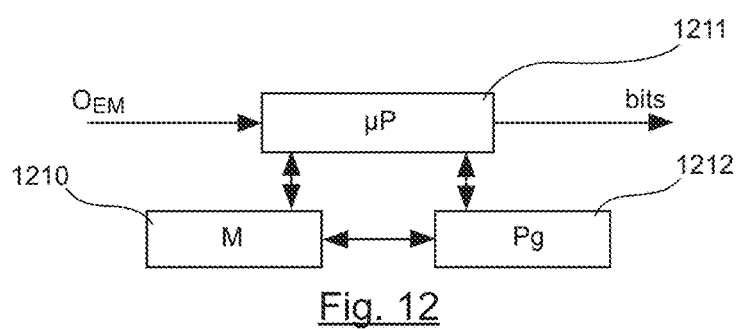

Referring now to FIGS. 11 and 12 respectively, we shall now describe the simplified structure of a device for transmitting and the structure of a device for receiving according to one particular embodiment of the invention.

As illustrated in FIG. 11, such a transmission device comprises a memory 1110 comprising a buffer memory, a processing unit 1111, equipped for example with a microprocessor μP, and driven by the computer program 1112, implementing the method for transmitting according to one embodiment of the invention.

At initialization, the code instructions of the computer program 1112 are for example loaded into a RAM and then executed by the processor of the processing unit 1111. The processing unit 1111 inputs at least one binary string of data. The microprocessor of the processing unit 1111 implements the steps of the method of transmission described here above according to the instructions of the computer program 1112 to generate an electromagnetic wave carrying an orbital angular momentum, of which the order of the orbital angular momentum represents, by bijection, the value of the data symbol to be transmitted. To this end, the device for transmitting comprises, in addition to the buffer memory 1110, a module for bijective selection of an order of orbital angular momentum associating, with each distinct data symbol value, a distinct order of orbital angular momentum and delivering a selected order of orbital angular momentum that is representative, by bijection, of the value of said at least one data symbol to be transmitted, and a module for transmitting said electromagnetic wave carrying an orbital angular momentum, for which the order of the orbital angular momentum corresponds to said selected order of orbital angular momentum.

These modules are driven by the microprocessor of the processing unit 1111.

As illustrated in FIG. 12, a reception device according to the invention for its part comprises a memory 1210 comprising a buffer memory, a processing unit 1211, equipped for example with a microprocessor μP, and driven by the computer program 1212, implementing the method for receiving according to one embodiment of the invention At initialization, the code instructions of the computer program 1212 are for example loaded into a RAM and then executed by the processor of the processing unit 1211. The processing unit 1211 inputs an electromagnetic wave carrying an orbital angular momentum. The microprocessor of the processing unit 1211 implements the steps of the method for receiving described here above according to the instructions of the computer program 1212 to estimate the data symbols transmitted. To this end, the reception device comprises, in addition to the buffer memory 1210, an estimator of the value of the data symbol implementing a detector of said order of orbital angular momentum.

These modules are driven by the microprocessor of the processing unit 1211.

Although the present disclosure has been described with reference to one or more examples, workers skilled in the art will recognize that changes may be made in form and detail without departing from the scope of the disclosure and/or the appended claims.

The invention claimed is:

1. A method for transmitting a sequence of data symbols comprising at least two data symbols of distinct values, delivering an electromagnetic wave carrying an orbital angular momentum, wherein the method comprises, for at least one data symbol to be transmitted, the following acts performed by a transmission device:

a bijective selection of an order of orbital angular momentum associating, with each distinct value of a data symbol, a distinct order of orbital angular momentum, and delivering a selected order of orbital angular momentum that is representative, by bijection, of the value of said at least one data symbol to be transmitted, and transmitting said electromagnetic wave carrying an orbital angular momentum, the order of orbital angular momentum of which corresponds to said selected order of orbital angular momentum, wherein the method further comprises the following acts implemented by the transmission device prior to said bijective selection:

receiving a binary data string, determining the maximum absolute value of order of orbital angular momentum that can be transmitted by the transmission device, forming said sequence of data symbols from said binary string, said act of forming taking account of said absolute maximum value of order of orbital angular momentum.

2. The method for transmitting according to claim 1, wherein said order of orbital angular momentum is selected when it is equal to the value of the data symbol to be transmitted.

3. The method for transmitting according to claim 1, wherein said act of forming corresponds to an N-state modulation, N being an integer equal to twice the absolute maximum value of the order of orbital angular momentum plus one.

4. The method for transmitting according claim 1, wherein, when said transmission device comprises a radiofrequency transmission device comprising a plurality of sending elements, said method for transmitting furthermore comprises an act of series-parallel replication of said order of the orbital angular momentum selected, delivering said order of orbital angular momentum at input of each sending element from said plurality of sending elements.

5. A device for transmitting a sequence of data symbols comprising at least two data symbols of distinct values, delivering an electromagnetic wave carrying an orbital angular momentum, wherein the device comprises, for at least one data symbol to be transmitted:
a module configured to make a bijective selection of an order of orbital angular momentum associating, with each distinct value of a data symbol, a distinct order of orbital angular momentum, and deliver a selected order of orbital angular momentum representing, by bijection, the value of said at least one data symbol to be transmitted, and
a transmitter, which transmits said electromagnetic wave carrying an orbital angular momentum, the order of the orbital angular momentum of which corresponds to said selected order of orbital angular momentum,
wherein the device is further configured to, prior to said bijective selection:
receive a binary data string,
determine the maximum absolute value of order of orbital angular momentum that can be transmitted by the transmission device,
form said sequence of data symbols from said binary string, taking account of said absolute maximum value of order of orbital angular momentum.

6. A method comprising:
receiving, by a receiving device, a signal transmitted in the form of an electromagnetic wave carrying an angular momentum delivering an estimation of a data symbol of a sequence of data symbols comprising at least two data symbols of distinct values, said electromagnetic wave carrying an orbital angular momentum having an order of orbital angular momentum selected bijectively during the transmission of said signal so as to represent, by bijection, the value of said data symbol, and
estimating, by the receiving device, the value of said data symbol, implementing an act of detecting said order of orbital angular momentum, wherein said detecting implements a determining of a phase gradient comprising:
shaping said signal in vector form,
unwrapping of a phase of each term of said vector form and of determining a phase of the product of the terms of said vector form,
obtaining said order of estimated orbital angular momentum implementing a division of said phase of the product of the terms of said vector form multiplied by the term $\pi(L-1)$, L being an integer corresponding to a maximum absolute value of the order of orbital angular momentum capable of being received, multiplied by two.

7. The method for receiving according to claim 6, wherein said detecting implements a Fourier transform of said signal.

8. The method for receiving according to claim 6, wherein said detecting is a detection by maximum likelihood.

9. The method for receiving according to claim 8, wherein said detecting by maximum likelihood is iterative and uses a Fisher information matrix.

10. The method for receiving according to claim 6, wherein the method further comprises a preliminary act of equalizing said signal in baseband.

11. A device comprising:
a receiver, which is configured to receive a signal transmitted in the form of an electromagnetic wave carrying an angular momentum, delivering an estimation of a data symbol of a sequence of data symbols comprising at least two data symbols of distinct values, said electromagnetic wave carrying an orbital angular momentum presenting an order of orbital angular momentum selected bijectively during the transmission of said signal so as to represent, by bijection, the value of said data symbol, and
an estimator of the value of said data symbol, implementing a detector of said order of orbital angular momentum, wherein said detector is configured for determining of a phase gradient comprising:
shaping said signal in vector form,
unwrapping of a phase of each term of said vector form and of determining a phase of the product of the terms of said vector form,
obtaining said order of estimated orbital angular momentum implementing a division of said phase of the product of the terms of said vector form multiplied by the term $\pi(L-1)$, L being an integer corresponding to a maximum absolute value of the order of orbital angular momentum capable of being received, multiplied by two.

12. A non-transitory computer-readable medium comprising a computer program stored thereon, comprising instructions to implement a method of transmitting a sequence of data symbols comprising at least two data symbols of distinct values, delivering an electromagnetic wave carrying an orbital angular momentum, when this program is executed by a processor of a transmission device, wherein the instructions configure the transmission device to perform the following acts, for at least one data symbol to be transmitted:
a bijective selection of an order of orbital angular momentum associating, with each distinct value of a data symbol, a distinct order of orbital angular momentum, and delivering a selected order of orbital angular momentum that is representative, by bijection, of the value of said at least one data symbol to be transmitted, and
transmitting said electromagnetic wave carrying an orbital angular momentum, the order of orbital angular momentum of which corresponds to said selected order of orbital angular momentum,
and wherein the instructions further configure the transmission device to perform the following acts prior to said bijective selection:
receiving a binary data string,
determining the maximum absolute value of order of orbital angular momentum that can be transmitted by the transmission device implementing said method for transmitting,
forming said sequence of data symbols from said binary string, said act of forming taking account of said absolute maximum value of order of orbital angular momentum.

* * * * *